(12) United States Patent
Pietilä et al.

(10) Patent No.: US 7,286,592 B2
(45) Date of Patent: Oct. 23, 2007

(54) METHOD AND APPARATUS FOR RECEIVING A SIGNAL

(75) Inventors: Samuli Pietilä, Tampere (FI); Harri Valio, Kämmenniemi (FI)

(73) Assignee: Nokia Mobile Phones, Ltd., Espoo (FI)

( * ) Notice: Subject to any disclaimer, the term of this patent is extended or adjusted under 35 U.S.C. 154(b) by 710 days.

(21) Appl. No.: 10/786,569

(22) Filed: Feb. 24, 2004

(65) Prior Publication Data
US 2005/0185700 A1    Aug. 25, 2005

(51) Int. Cl.
*H04B 1/69* (2006.01)
(52) U.S. Cl. ..................................... 375/147
(58) Field of Classification Search ................ 375/147, 375/130, 316, 347, 324, 346; 455/83, 168.1
See application file for complete search history.

(56) References Cited

U.S. PATENT DOCUMENTS

| 6,618,434 B2 * | 9/2003 | Heidari-Bateni et al. ... 375/148 |
| 2002/0177465 A1 | 11/2002 | Robinetti |
| 2002/0193108 A1 | 12/2002 | Robinett |
| 2006/0140254 A1 * | 6/2006 | Pietila et al. ................ 375/147 |

OTHER PUBLICATIONS

Satellite Mobile Multimedia Services in the UMTS—the SUMO project Vehicular Technology Conference, 199, VTC 1999-Fall. IEEE VTS 50th, publication Sep. 19-22, 1999 vol. 5 p. 2750-2754 Accession No. 6521020 see p. 2750 lefthand column line 26-40.

* cited by examiner

*Primary Examiner*—Khai Tran (57) ABSTRACT

The present invention provides a method for a flexible multimode operation of spread spectrum receivers, e.g., global navigation satellite system (GNSS) receivers, using a shared circuitry hardware configuration of the receiver for processing of different types of code division multiple access (CDMA) signals. According to said method the receiver utilizes shared channel circuitry to receive signals of different CDMA types providing a flexible multimode operation. The present invention provides a way to select the received signal type for each channel by replacing the dedicated channels with multimode channels suitable to multiple types of receiver signals. The multimode receiver is more flexible to operate in varying reception conditions. By utilizing shared channel circuitry the hardware size is kept small.

35 Claims, 8 Drawing Sheets

METHOD AND APPARATUS FOR RECEIVING A SIGNAL

FIELD OF THE INVENTION

This invention generally relates to a spread spectrum receiver, and more specifically to a multimode operation of the receiver using a shared circuitry hardware configuration.

BACKGROUND OF THE INVENTION

1. Field of Technology and Problem Formulation

It is desirable to have a spread spectrum receiver capable of receiving at least two (or more) types of code division multiple access (CDMA) signals. For example, dual mode GPS (global positioning system)/Galileo receivers must be able to receive both GPS and Galileo signals simultaneously. An obvious approach used so far is combining a GPS receiver and a Galileo receiver, so that some hardware receiving channels are dedicated to receive a GPS signal, and some channels are dedicated to receive a Galileo signal. For example, a 16-channel receiver can have 8 GPS channels and 8 Galileo channels. However, in some situations it might be desirable to receive e.g., 12 Galileo signals and 4 GPS signals due to DOP (dilution of precision) or signal blocking conditions. With the 8 GPS channels plus 8 Galileo channels hardware this is impossible. Therefore, a more flexible multimode operation of the spread spectrum receiver and hardware architecture is desirable.

2. Prior Art

Figure 1:
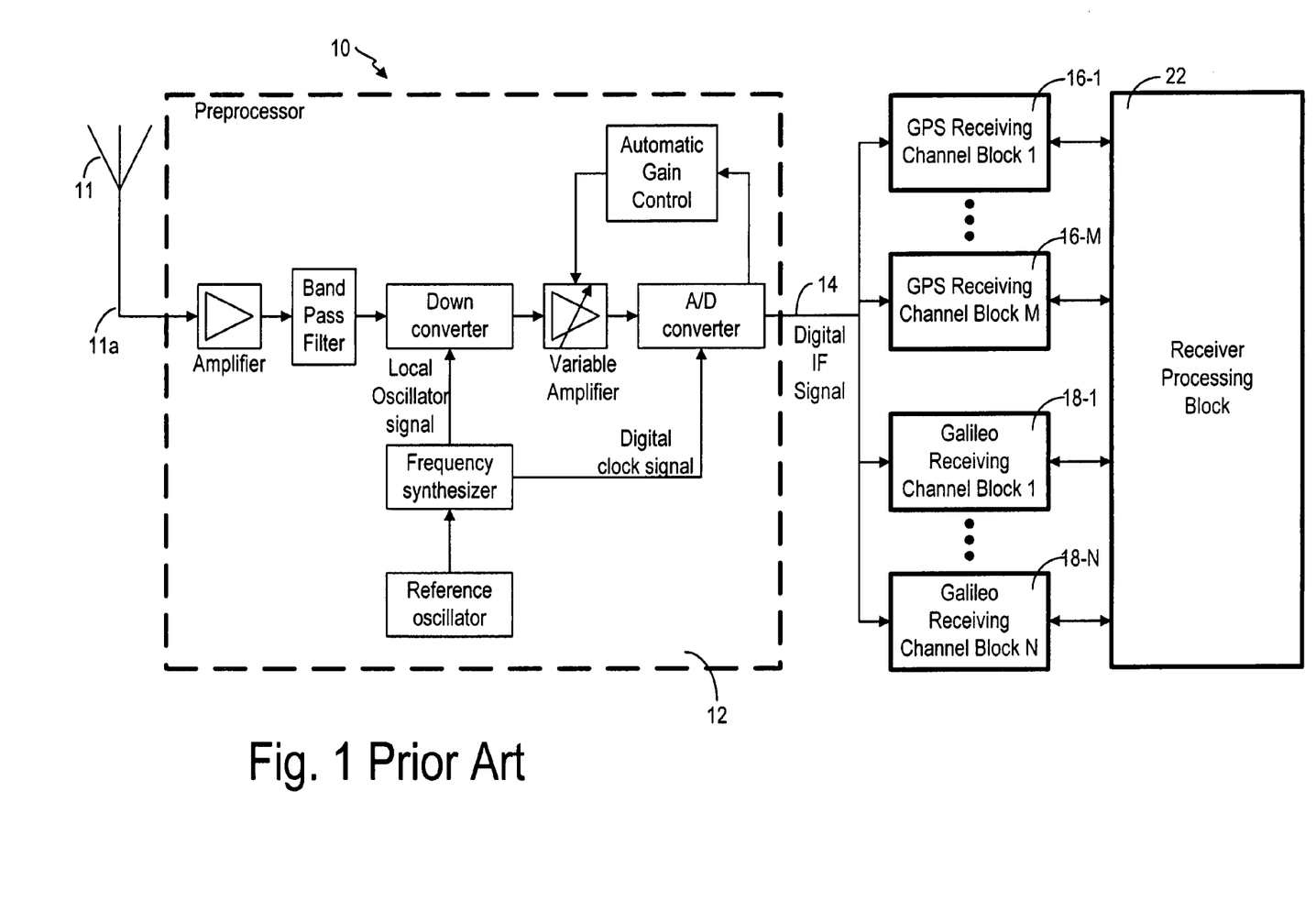
FIG. 1 is a block diagram representing an example of a global navigation satellite system receiver with dedicated GPS and Galileo receiving channel blocks, according to the prior art.
Figure 2:
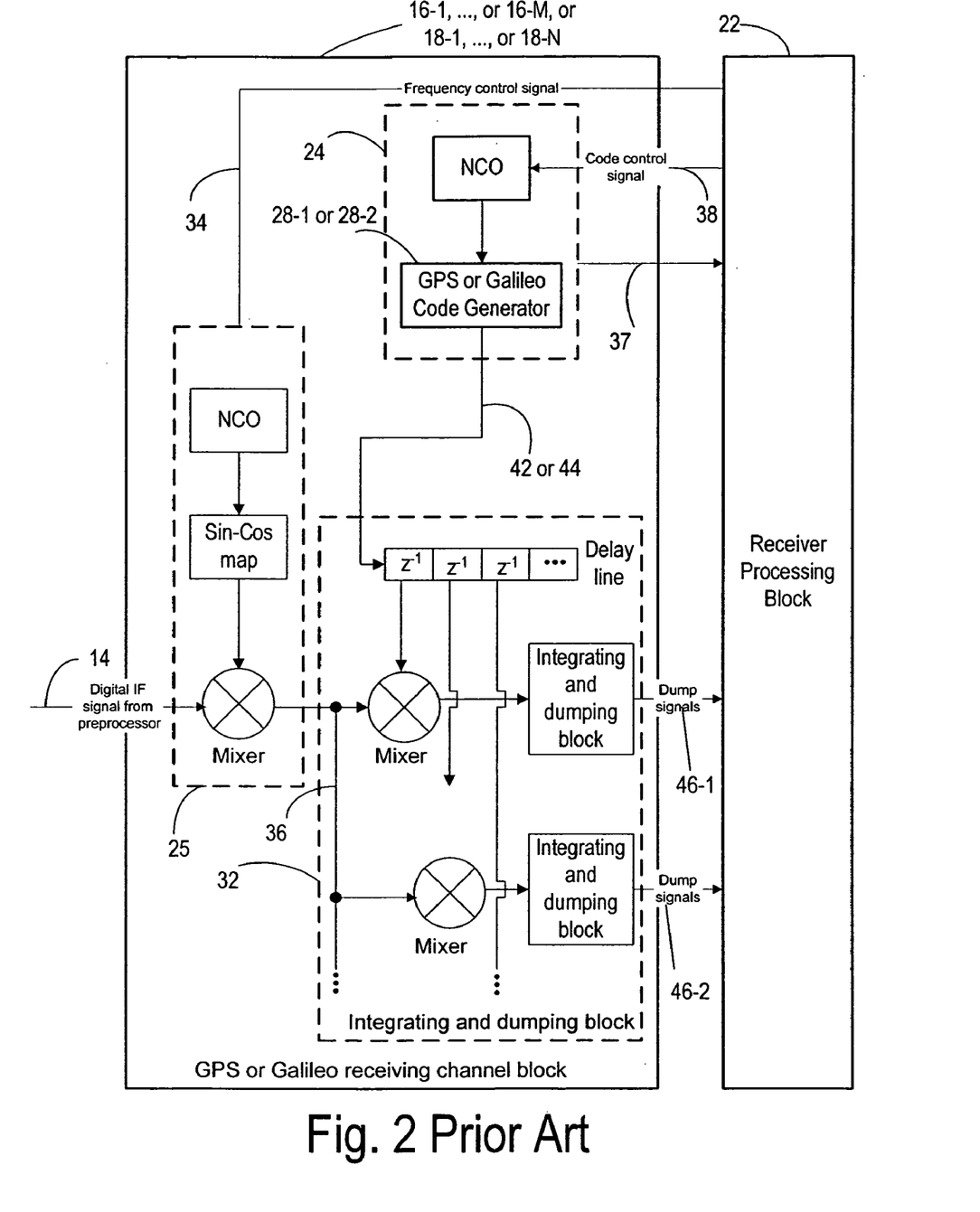
FIG. 2 is a block diagram representing an example of a dedicated GPS receiving channel block or a Galileo receiving channel block, according to the prior art.

An example of a prior art solution is demonstrated in FIGS. 1 and 2. FIG. 1 is a block diagram representing one example of a typical operation of a global navigation satellite system receiver 10 with dedicated M GPS receiving channel blocks 16-1, 16-2, . . . , 16-M and dedicated N Galileo receiving channel blocks 18-1, 18-2, . . . , 18-N, wherein M is an integer of at least a value of one and N is an integer of at least a value of one. Typical operation includes receiving the radio frequency signal and converting said radio frequency signal to a radio frequency electrical signal 11a by an antenna 11 followed by converting said radio frequency electrical signal 11a to a digital intermediate frequency (IF) signal 14 by a preprocessor 12 and providing said digital IF signal 14 to the dedicated M GPS receiving channel blocks 16-1, 16-2, . . . , 16-M and to the dedicated N Galileo receiving channel blocks 18-1, 18-2, . . . , 18-N, which normally exchange information with the receiver processing block 22 during their operation.

FIG. 2 is a block diagram representing an example of one of the dedicated GPS receiving channel blocks 16-1, 16-2, . . . , 16-M or the dedicated Galileo receiving channel blocks 18-1, 18-2, . . . , 18-N shown in FIG. 1. As seen from FIG. 2, the only difference between the GPS receiving channel blocks 16-1, 16-2, . . . , 16-M and the Galileo receiving channel blocks 18-1, 18-2, . . . , 18-N is in a code generating block 24 which uses a dedicated GPS code generator 28-1 for generating a GPS code signal 42 in case of the GPS receiving channel blocks 16-1, 16-2, . . . , 16-M and a dedicated Galileo code generator 28-2 for generating a Galileo code signal 44 in case of the Galileo receiving channel blocks 18-1, 18-2, . . . , 18-N, respectively. All other components including an integrating and damping block 32 and a residual carrier removing block 25 as well as a frequency control signal 34, a code control signal 38, a data intermediate signal 36, a code and carrier measurement signal 37 and dump signals 46-1, 46-2, . . . , 46-P (P is an integer of at least a value of one) perform identical functions for both GPS and Galileo receiving channel blocks 16-1, 16-2, . . . , 16-M, 18-1, 18-2, . . . , 18-N.

FIGS. 1 and 2 demonstrate only one example for implementing the global navigation satellite system receiver 10 per the prior art. It is noted that details incorporated in blocks 12 and 16-1, 16-2, . . . , 16-M, 18-1, 18-2, . . . , or 18-N are provided for reference only and represent only one example among many others for implementation of these blocks.

SUMMARY OF THE INVENTION

It is now invented a novel method for providing a multimode operation of a spread spectrum receiver, e.g., a global navigation satellite system (GNSS) receiver, using a shared circuitry hardware configuration of said receiver.

According to a first aspect of the invention, a multimode spread spectrum receiver with a shared circuitry operation, capable of receiving at least two types of code division multiple access (CDMA) signals, comprises: an antenna, responsive to a radio frequency signal containing said at least two types of code division multiple access (CDMA) signals, for providing a radio frequency electrical signal; a preprocessor, responsive to the radio frequency electrical signal, for providing a digital signal; and at least one multimode receiving channel block, responsive to the digital signal and selecting, based on a predetermined selection criteria, one of at least two types of coding corresponding to one of said at least two types code division multiple access (CDMA) signals and utilizing said coding for further processing of said digital signal by said at least one multimode receiving block using said shared circuitry operation.

According further to the first aspect of the invention, the digital signal may be a digital intermediate frequency signal, said selection may be performed by the at least one multimode receiving channel block in response to a mode selection signal or to a mode-generating selection signal and finally said at least one multimode receiving channel block may generate, based on said selection, and provide internally one of the at least two code signals to said at least one multimode receiving channel block for implementing said further processing. Further, the at least one multimode receiving channel block may be further responsive to a code control signal and providing a code and carrier measurement signal. Still further, the multimode receiver may further comprise a receiver processing block, responsive to the code and carrier measurement signal, for providing the code control signal, a frequency control signal, and the mode selection signal or the mode-generating selection signal. Yet still further, the multimode receiver may further comprise: a residual carrier removing block, responsive to the digital intermediate frequency signal, for providing a data intermediate signal; and an integration and dumping block responsive to the data intermediate signal, to said one of the at least two code signals, for providing P dump signals to the receiver processing block, wherein P is an integer of at least a value of one.

Further according to the first aspect of the invention, the at least one multimode receiving channel block may comprise: a code numerically controlled oscillator block, responsive to the code control signal, for providing a numerically controlled oscillator clock signal; a first code generator, responsive to the numerically controlled oscillator clock signal, for providing a first one of the at least two code signals for a corresponding first one of the at least two types of the code division multiple access receiver processing; a second code generator responsive to the numerically controlled oscillator clock signal, for providing a second one of the at least two code signals for a corresponding second one of the at least two types of the code division multiple access receiver processing; and a code selector, responsive to the mode selection signal, to said first one of the at least two code signals and to said second one of the at least two code signals, for providing said first one of the at least two code signals or said second one of the at least two code signals, selected by the code selector based on the mode selection signal, for further processing by the at least one multimode receiving channel block using said shared circuitry operation. Further, the first code generator, the second code generator or both code generators may contain binary offset carrier capabilities. Yet still further, the first one of the at least two code signals may be for global positioning system receiver processing and the second one of the at least two code signals may be for Galileo receiver processing.

Still further according to the first aspect of the invention, the at least one multimode receiving channel block may comprise: a code numerically controlled oscillator block responsive to the code control signal, for providing a numerically controlled oscillator clock signal; and a universal code generator, responsive to the numerically controlled oscillator clock signal and to the mode-generating selection signal, for generating and providing, based on the mode-generating selection signal, a first one of the at least two code signals for a corresponding first one of the at least two types of the code division multiple access receiver processing or a second one of the at least two code signals for a corresponding second one of the at least two types of the code division multiple access receiver processing for further processing by the at least one multimode receiving channel block using said shared circuitry operation. Further still, the universal code generator may contain binary offset carrier capabilities.

According further to the first aspect of the invention, the receiver may be a multimode global navigation satellite system receiver. Yet still further, a first one of the at least two code signals may be for global positioning system receiver processing and a second one of the at least two code signals may be for Galileo receiver processing.

According to a second aspect of the invention, a method for a shared circuitry operation of a multimode spread spectrum receiver, capable of receiving at least two types of code division multiple access signals, comprises:receiving the radio frequency signal containing said at least two types of code division multiple access signals by an antenna of the multimode spread spectrum receiver and converting said radio frequency signal to a radio frequency electrical signal; converting the radio frequency electrical signal to a digital signal by a preprocessor of the multimode spread spectrum receiver and providing said digital signal to the at least one multimode receiving channel block; and selecting by at least one multimode receiving channel block, based on a predetermined selection criteria, one of at least two types of coding corresponding to one of said at least two types code division multiple access signals and utilizing said coding for further processing of said digital signal by said at least one multimode receiving block using said shared circuitry operation. Further, the digital signal may be a digital intermediate frequency signal, said selection may be performed by the at least one multimode receiving channel block in response to a mode selection signal or to a mode-generating selection signal and finally said at least one multimode receiving channel block may generate, based on said selection, and provide internally one of the at least two code signals to said at least one multimode receiving channel block for implementing said further processing.

According further to the second aspect of the invention, the selection by at least one multimode receiving block, based on a predetermined selection criteria, of one of at least two types of coding may comprise: generating a first one of the at least two code signals for a corresponding first one of the at least two types of the code division multiple access receiver processing by a first code generator and generating a second one of the at least two code signals for a corresponding second one of the at least two types of the code division multiple access receiver processing by a second code generator and providing said first one of the at least two code signals and said second one of the at least two code signals to a code selector of the at least one multimode receiving channel block, wherein said first one of the at least two code signals and said second one of the at least two code signals are parts of said at least one multimode receiving channel block; selecting said first one of the at least two code signals or said second one of the at least two code signals by the code selector; and providing the selected said first one of the at least two code signals or said second one of the at least two code signals for further processing by the at least one multimode receiving channel block using said shared circuitry operation. Further, said selecting of said first one of the at least two code signals or said second one of the at least two code signals by the code selector may be based on the mode selection signal provided to the code selector by a receiver processing block.

Further according to the second aspect of the invention, before generating the first one of the at least two code signals and the second one of the at least two code signals, the method may further comprise: providing a code control signal to a code numerically controlled oscillator block of the at least one multimode receiving channel block; and generating, in response to said code control signal, a numerically controlled oscillator clock signal by the code numerically controlled oscillator block and providing the numerically controlled oscillator clock signal to the first code generator and to the second code generator. Further, said code control signal may be provided to the code numerically controlled oscillator block by a receiver processing block. Still further, Still further according to the second aspect of the invention, the further processing may be performed by an integrating and dumping block of the at least one multimode receiving channel block. Further, before providing the code control signal, the method may further comprise: generating a data intermediate signal by removing a residual carrier frequency from the digital intermediate frequency signal by a residual carrier removing block of the at least one multimode receiving channel block and providing said data intermediate signal to the integrating and dumping block for further processing.

According further to the second aspect of the invention, the selection by at least one multimode receiving block, based on a predetermined selection criteria, of one of at least two types of coding may comprise: generating a first one of the at least two code signals for a corresponding first one of the at least two types of the code division multiple access receiver processing or a second one of the at least two code signals for a corresponding second one of the at least two types of the code division multiple access receiver processing by a universal code generator of the at least one multimode receiving channel block; and providing the first one of the at least two code signals or the second one of the at least two code signals by the universal code generator for further processing by the at least one multimode receiving channel block using said shared circuitry operation. Further, generating the first one of the at least two code signals or the second one of the at least two code signals by the universal code generator may be based on the mode-generating selection signal provided to the universal code generator by a receiver processing block. Still further, before generating the first one of the at least two code signals and the second one of the at least two code signals, the method may further comprise: providing a code control signal to a code numerically controlled oscillator block of the at least one multimode receiving channel block; and generating, in response to said code control signal, a numerically controlled oscillator clock signal by the code numerically controlled oscillator block and providing the numerically controlled oscillator clock signal to the universal code generator. Yet still further, said code control signal may be provided to the code numerically controlled oscillator block by a receiver processing block.

According still further to the second aspect of the invention, the further processing may be performed by an integrating and dumping block of the at least one multimode receiving channel block. Further, before providing the code control signal, the method may further comprise: generating a data intermediate signal by removing a residual carrier frequency from the digital intermediate frequency signal by a residual carrier removing block of the at least one multimode receiving channel block and providing said data intermediate signal to the integrating and dumping block for further processing.

According further still to the second aspect of the invention, said receiver may be a multimode global navigation satellite system receiver. Still further, a first one of the at least two code signals may be for global positioning system receiver processing and a second one of the at least two code signals may be for Galileo receiver processing.

According to a third aspect of the invention, a computer program product comprises: a computer readable storage structure embodying computer program code thereon for execution by a computer processor with said computer program code characterized in that it includes instructions for performing the steps of the method of the second aspect indicated as being performed by the multimode spread spectrum receiver, or by the multimode receiving channel block of said spread spectrum receiver, or by a terminal containing said spread spectrum receiver.

According to a fourth aspect of the invention, a system for communicating at least two types of code division multiple access signals received by a multimode spread spectrum receiver with a shared circuitry operation, comprises: at least one satellite, for providing said at least two types of code division multiple access signals, or at least two satellites each providing one of said at least two types of the code division multiple access signals; at least one base station, for providing said at least two types of the code division multiple access signals used for mobile communications; and a terminal, responsive to said at least two different types of the code division multiple access signals, wherein said terminal containing said multimode spread spectrum receiver capable of receiving said at least two types of code division multiple access signals using at least one multimode receiving channel block, responsive to the digital signal indicative of one of said at least two different types of the code division multiple access signals and selecting, based on a predetermined selection criteria, one of at least two types of coding corresponding to said one of the at least two types code division multiple access signals and utilizing said coding for further processing of said digital signal by said at least one multimode receiving block using said shared circuitry operation.

According to a fifth aspect of the invention, a multimode receiving module with a shared circuitry operation capable of receiving at least two types of code division multiple access signals and contained in a multimode spread spectrum receiver, comprises: at least one multimode receiving channel block, responsive to the digital signal containing one of said at least two types of the code division multiple access signals and selecting, based on a predetermined selection criteria, one of at least two types of coding corresponding to said one of at least two types code division multiple access signals and utilizing said coding for further processing of said digital signal by said at least one multimode receiving block using said shared circuitry operation, wherein said multimode receiving module is removable from said multimode spread spectrum receiver.

BRIEF DESCRIPTION OF THE DRAWINGS

For a better understanding of the nature and objects of the present invention, reference is made to the following detailed description taken in conjunction with the following drawings, in which.

DETAILED DESCRIPTION OF THE INVENTION

The present invention provides a method for a flexible multimode operation of spread spectrum receivers, e.g., global navigation satellite system (GNSS) receivers using a shared circuitry hardware configuration of the receiver for processing of different types of code division multiple access (CDMA) signals. According to said method the receiver utilizes shared channel circuitry to receive signals from different satellite systems providing a flexible multimode operation. The present invention provides a way to select the received signal type (e.g., GPS or Galileo) for each channel. By replacing the dedicated GPS/Galileo channels with multimode channels suitable to both receiver signals or, in a general case, by replacing the dedicated channels with multimode channels suitable to multiple types (more than two) of receiver signals, the receiver is more flexible to operate in varying reception conditions. By utilizing shared channel circuitry the hardware size is kept small.

Figure 3:
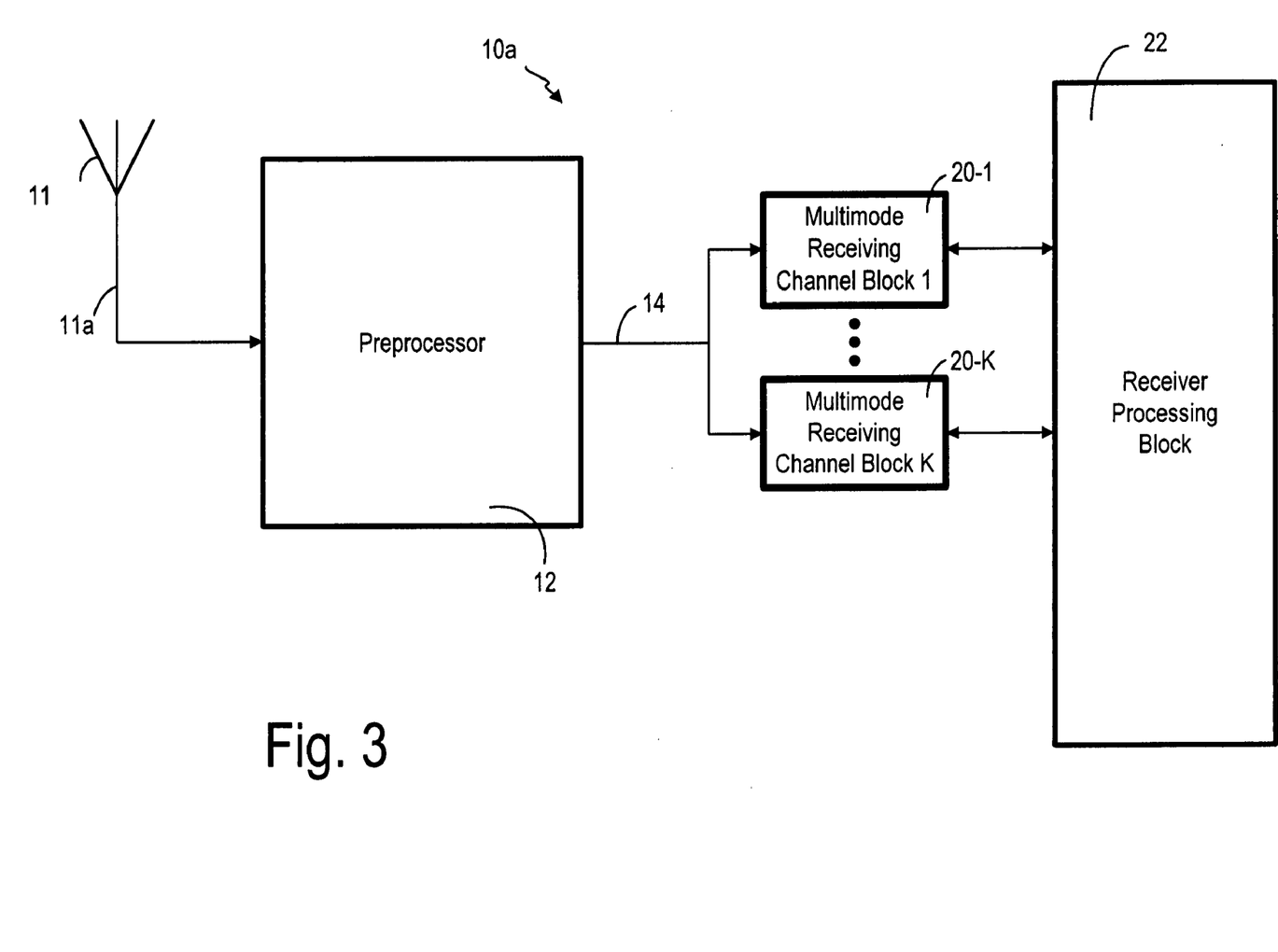
FIG. 3 is a block diagram representing an example of a multimode global navigation satellite system receiver with a shared circuitry operation, capable of generating and providing GPS or Galileo code signals, according to the present invention.

FIG. 3 is a block diagram representing one example among others of a multimode global navigation satellite system receiver 10a with a shared circuitry operation, capable of generating and providing GPS or Galileo code signals, according to the present invention. The key difference between FIG. 3 and FIG. 1 describing the prior art is that the dedicated GPS receiving channel blocks 16-1, 16-2, . . . , 16-M and the Galileo receiving channel blocks 18-1, 18-2, . . . , 18-N of FIG. 1 are substituted by multimode receiving channel blocks 20-1, 20-2, . . . , 20-K (K is an integer of at least a value of one), each capable of both GPS and Galileo signal processing.

Figure 4:
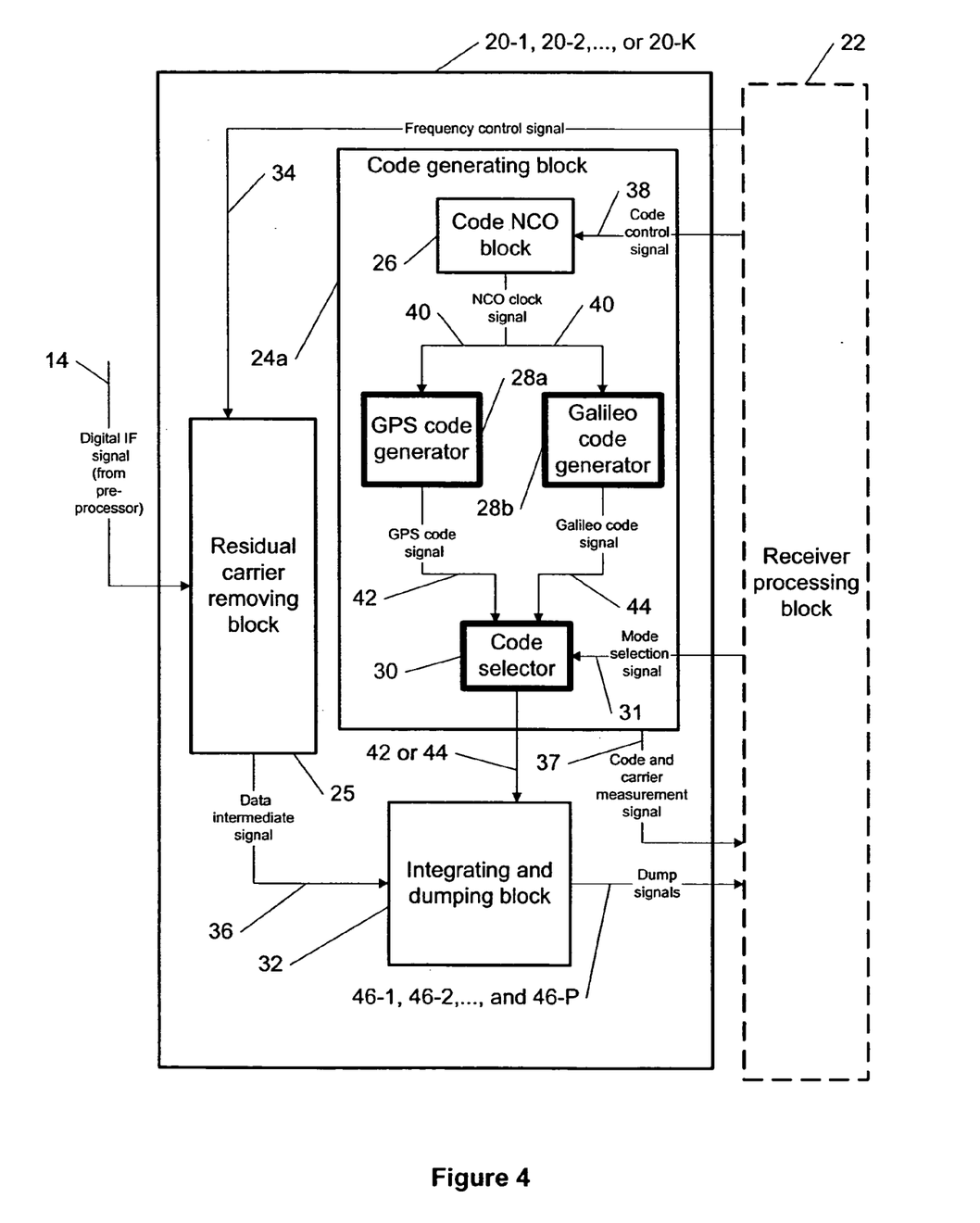
FIG. 4 is a block diagram representing an example of a multimode receiving channel block, a part of a multimode global navigation satellite system receiver, with a shared circuitry operation, capable of generating and providing a GPS code signal or a Galileo code signal, according to the present invention.

FIG. 4 is a block diagram representing one example among many others of a multimode receiving channel block 20-1, 20-2, . . . , or 20-K with a shared circuitry operation, capable of generating and providing a GPS code signal 42 or a Galileo code signal 44, according to the present invention. Again, the key difference between FIG. 4 and FIG. 2 describing the prior art is that the multimode receiving channel block 20-1, 20-2, . . . , or 20-K has a modified code generation block 24a instead of the block 24. The code generation block 24a consists of a code numerically controlled oscillator (NCO) block 26, which generates a numerically controlled oscillator (NCO) clock signal 40 in response to the code control signal 38 from the receiver processing block 22 as in the prior art. But then said NCO clock signal 40 is provided to both a GPS code generator 28a and to a Galileo code generator 28b. The GPS code generator 28a and a Galileo code generator 28b generate a GPS code signal 42 and a Galileo code signal 44, respectively, and provide both signals 42 and 44 to a code selector 30. The code selector 30 selects the GPS code signal 42 or the Galileo code signal 44 based on a mode selection signal 31 provided to the code selector 30 by the receiver processing block 22. Finally, the selected GPS code signal 42 or the Galileo code signal 44 is provided to the integrating and dumping block 32 which performs further processing as in the prior art (see FIG. 2).

Figure 5:
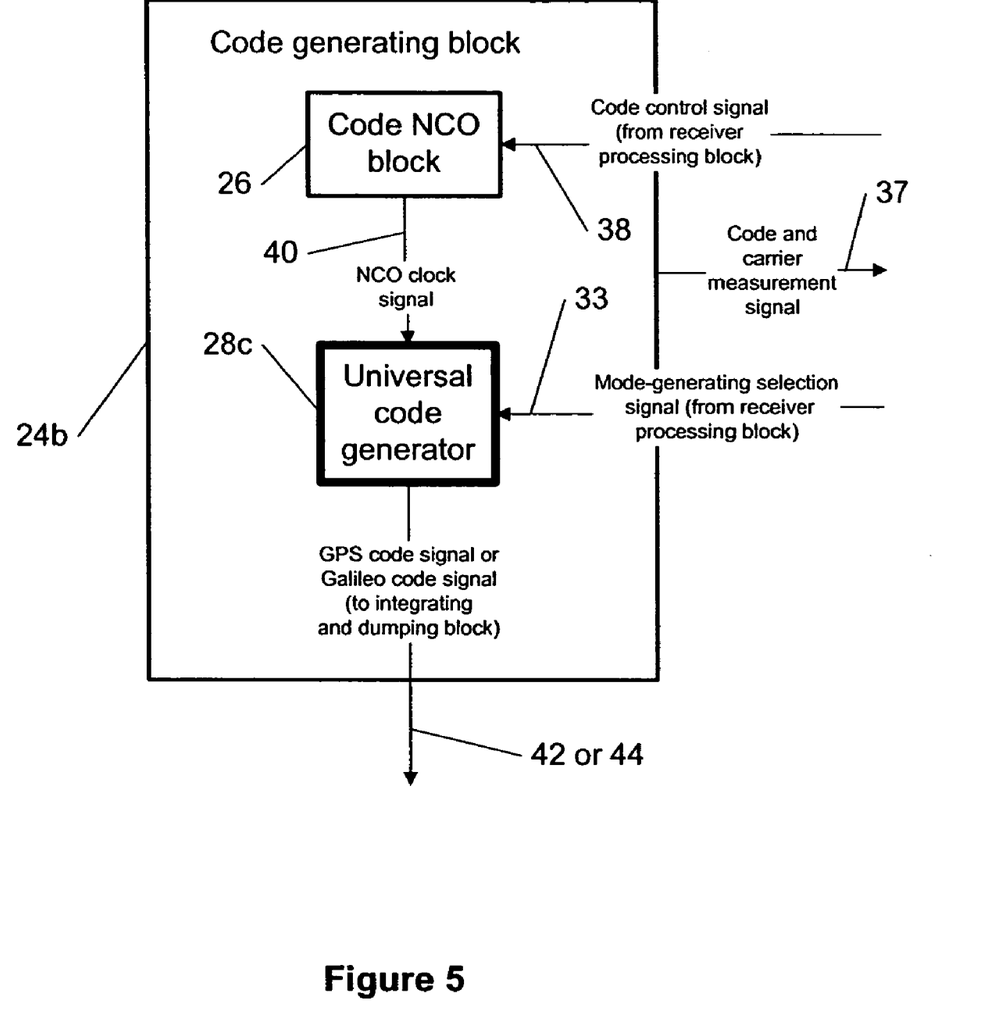
FIG. 5 is a block diagram representing an alternative example for a code generating block of a multimode receiving channel block, according to the present invention.

FIG. 5 is a block diagram representing an alternative example among others for implementing of a code generating block 24b of a multimode receiving channel block 20-1, 20-2, . . . , or 20-K with a shared circuitry operation, capable of generating and providing the GPS code signal 42 or the Galileo code signal 44, according to the present invention. The difference between the block 24b and the block 24a of FIG. 4 is that a universal code generator 28c of the block 24b shown in FIG. 5 performs the functions performed by the blocks 28a, 28b and 30 of FIG. 4. In particular, the NCO clock signal 40 is provided by the code NCO block 26 only to the universal code generator 28c, which generates the GPS code signal 42 or the Galileo code signal 44 based on a mode-generating selection signal 33 provided to the universal code generator 28c by the receiver processing block 22. And finally, the generated GPS code signal 42 or the Galileo code signal 44 is provided to the integrating and dumping block 32 which performs further processing as in the prior art (see FIG. 2).

Figure 6:
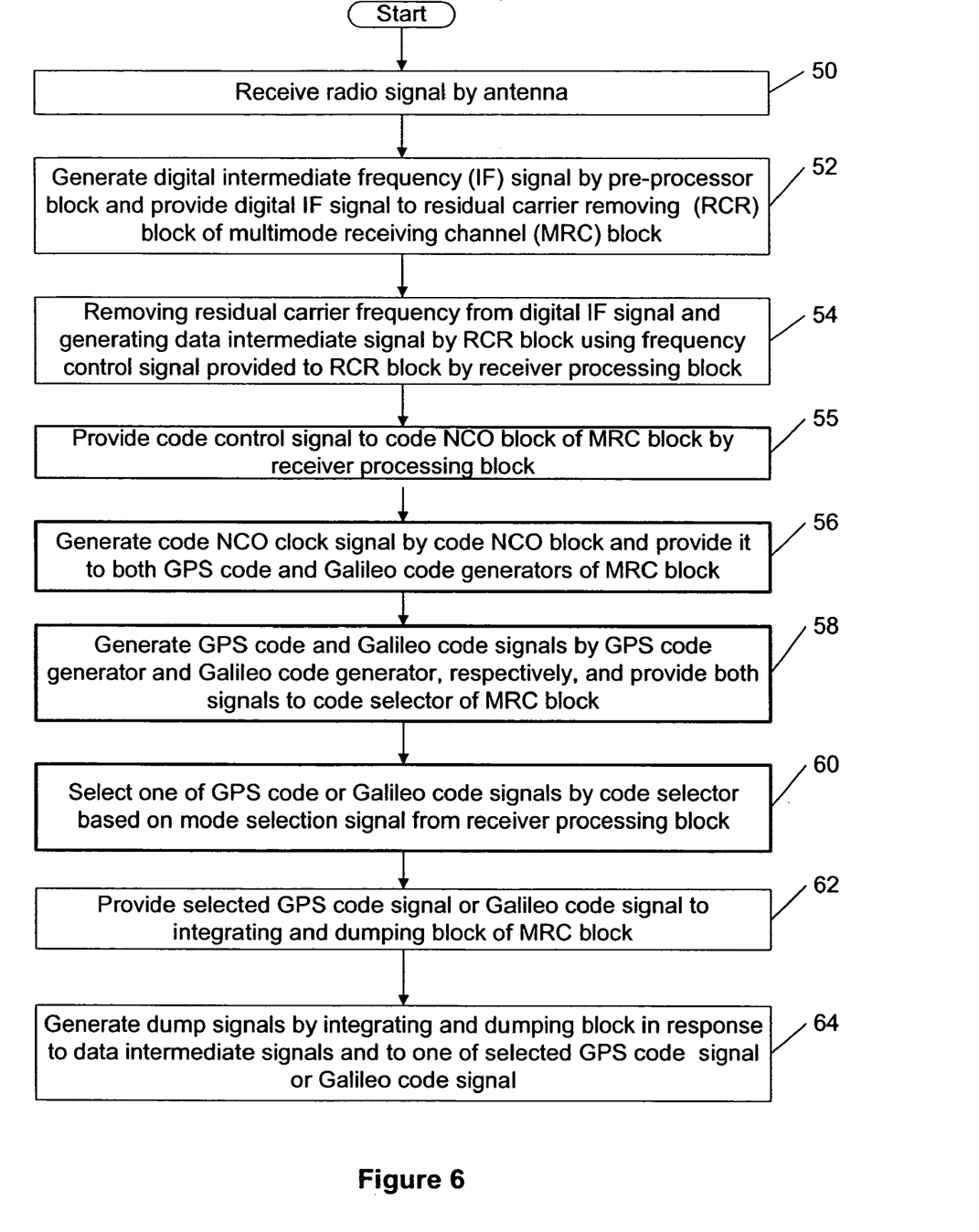
FIG. 6 shows an example of a flow chart for generating and providing a GPS code signal or a Galileo code signal by a multimode receiving channel block with a shared circuitry operation, according to the present invention.

FIG. 6 shows an example of a flow chart for generating and providing the GPS code signal 42 or the Galileo code signal 44 by the multimode receiving channel block 20-1, 20-2, . . . , or 20-K with the shared circuitry operation as shown in FIG. 4, according to the present invention. The flow chart of FIG. 6 represents only one possible scenario among others. In a method according to the present invention, in a first step 50, the radio frequency signal is received by the antenna 11 and converted to the radio frequency electrical signal 11a. In a next step 52, said radio frequency electrical signal 11a is converted to a digital intermediate frequency signal 24 by a preprocessor 12 and provided to the residual carrier removing (RCR) block 25 of the multimode receiving channel block 20-1, 20-2, . . . , or 20-K. In a next step 54, the RCR block 25 removes a residual carrier frequency from the digital IF signal 14 using the frequency control signal 34 provided to the RCR block 25 by the receiver processing block 22 thus generating the data intermediate signal 36 and providing said signal 36 to the integrating and dumping block 32 for further processing. In a next step 55, the code control signal 38 is provided to the code NCO block 26 by the receiver processing block 22. In a next step 56, the NCO block 26 generates the NCO clock signal 40 in response to the code control signal 38 from the receiver processing block 22 and provides said NCO clock signal 40 to both the GPS code generator 28a and to the Galileo code generator 28b. In a next step 58, the GPS code generator 28a and a Galileo code generator 28b generate the GPS code signal 42 and the Galileo code signal 44, respectively, and provide both signals 42 and 44 to the code selector 30. In a next step 60, the code selector 30 selects the GPS code signal 42 or the Galileo code signal 44 based on the mode selection signal 31 provided to the code selector 30 by the receiver processing block 22. In a next step 62, the selected GPS code signal 42 or the Galileo code signal 44 is provided to the integrating and dumping block 32 of the multimode receiving channel block 20-1, 20-2, . . . , or 20-K for further processing. Finally, in a next step 64, dump signals 46-1, 46-2, . . . , 46-P are generated, in response to the signals 42 or 44 and to the data intermediate signal 36, and provided to the receiver processing block 22.

Figure 7:
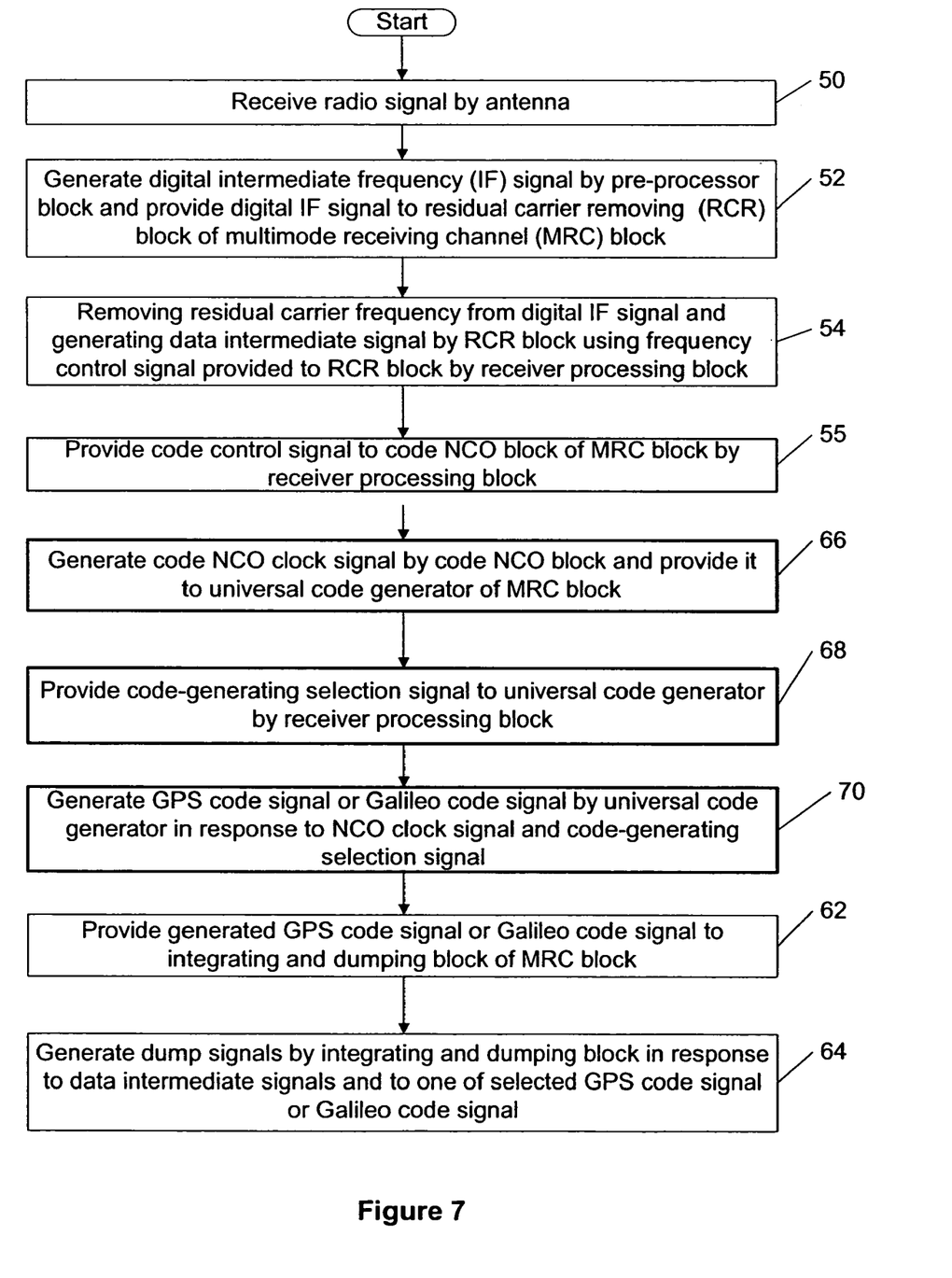
FIG. 7 shows an alternative example of a flow chart for generating and providing a GPS code signal or a Galileo code signal by a code generating block of a multimode receiving channel block, according to the present invention.

FIG. 7 shows an alternative example among many others of a flow chart for generating and providing the GPS code signal 42 or the Galileo code signal 44 by the multimode receiving channel block 20-1, 20-2, . . . , or 20-K with the shared circuitry operation as shown in FIG. 5, according to the present invention. First four steps 50 through 55 are the same as in FIG. 6 and are described above. In a next step 66, the NCO block 26 generates the NCO clock signal 40 in response to the code control signal 38 from the receiver processing block 22 and provides the NCO clock signal 40 to the universal code generator 28c. In a next step 68, the mode-generating selection signal 33 is provided to the universal code generator 28c by the receiver processing block 22. In a next step 70, the code generator 28c generates the GPS code signal 42 or the Galileo code signal 44 in response to the mode-generating selection signal 33. The last two steps 62 and 64 are the same as in FIG. 6 and are described above.

There are many variations of the scenarios described above, according to the present invention. For example, the code generator blocks 28a, 28b and 28c can also include binary offset carrier (BOC) generation. Also, it is not necessary that all channels are multimode channels as presented in FIG. 3. It is also possible to have a mixture of dedicated channels and multimode channels.

Figure 8:
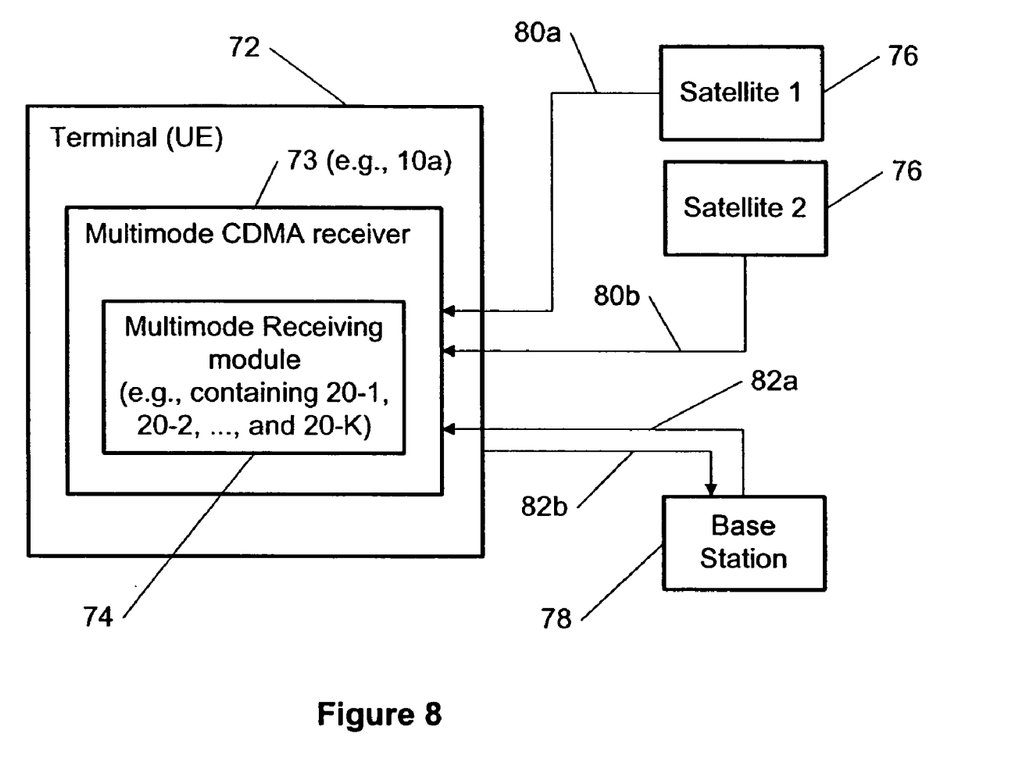
FIG. 8 shows an example of a terminal with a spread spectrum multimode CDMA receiver using a shared circuitry hardware configuration of the receiver for multimode operation processing of different types of code division multiple access (CDMA) signals from satellites or a base station.

Although GPS and Galileo satellite navigation systems have been used as an example in the description, it is obvious that the present invention can be used equally well with other navigation systems or more generally to any communication system utilizing a multimode spread spectrum receiver. An example of such a system is shown in FIG. 8. A terminal (or a user equipment, UE) 72 is a communication device, such as a mobile device or a mobile phone, containing a multimode CDMA receiver 73 according to the present invention. The multimode CDMA receiver 73 can be, for instance, the multimode global navigation satellite system (GNSS) receiver 10a described in the examples of FIGS. 3 through 7. Moreover, said multimode CDMA receiver 73 contains a multimode receiving module 74 with the key innovation as described in the present invention. The block 74 can be built as a removable unit. The multimode receiving module 74 can be, for example, a combination of blocks 20-1, 20-2, . . . , and 20-K as presented in FIG. 3 for the multimode GNSS receiver 10a. FIG. 8 shows at least two satellites (e.g., GPS application typically requires 3 satellites) 76 sending two different types of CDMA signals, CDMA 1 and CDMA 2 satellite signals 80a and 80b, respectively, to the CDMA receiver 73. FIG. 8 also shows a base station 78, which communicates with the terminal 72 by sending, e.g., a mobile CDMA communication signal 82a to the multimode CDMA receiver 73 and receiving back the outgoing communication signal 82b from the terminal 72. Said signal 82a can be of various CDMA types and is processed by the multimode receiving module as described in the present invention.

As explained above, the invention provides both a method and corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code, i.e. the software or firmware thereon for execution by a computer processor provided with the terminal 72, with the CDMA receiver 73 (e.g., multimode global navigation satellite system receiver 10a) or with the multimode receiving module 74 (e.g., multimode receiving channel blocks 20-1, 20-2, . . . and 20-K).

What is claimed is:

1. A multimode spread spectrum receiver, comprising:
an antenna, responsive to a radio frequency signal containing at least two types of code division multiple access signals, for providing a radio frequency electrical signal;
a preprocessor, responsive to the radio frequency electrical signal, for providing a digital signal; and
at least one multimode receiving channel block, responsive to the digital signal and configured to select, based on a predetermined selection criteria, one of at least two types of coding corresponding to one of said at least two types code division multiple access signals and utilizing said coding for further processing of said digital signal by said at least one multimode receiving block using a shared circuitry operation.

2. The multimode receiver of claim 1, wherein the digital signal is a digital intermediate frequency signal, wherein said selection is performed by the at least one multimode receiving channel block in response to a mode selection signal or to a mode-generating selection signal and wherein said at least one multimode receiving channel block is configured to generate, based on said selection, and to provide internally one of the at least two code signals to said at least one multimode receiving channel block for implementing said further processing.

3. The multimode receiver of claim 2, wherein the at least one multimode receiving channel block is further responsive to a code control signal and configured to provide a code and carrier measurement signal.

4. The multimode receiver of claim 3, further comprising:
a receiver processing block, responsive to the code and carrier measurement signal, for providing the code control signal, a frequency control signal, and the mode selection signal or the mode-generating selection signal.

5. The multimode receiver of claim 4, further comprising:
a residual carrier removing block, responsive to the digital intermediate frequency signal, for providing a data intermediate signal; and
an integration and dumping block responsive to the data intermediate signal, to said one of the at least two code signals, for providing P dump signals to the receiver processing block, wherein P is an integer of at least a value of one.

6. The multimode receiver of claim 4, wherein the at least one multimode receiving channel block comprises:
a code numerically controlled oscillator block, responsive to the code control signal, for providing a numerically controlled oscillator clock signal;
a first code generator, responsive to the numerically controlled oscillator clock signal, for providing a first one of the at least two code signals for a corresponding first one of the at least two types of the code division multiple access receiver processing;
a second code generator responsive to the numerically controlled oscillator clock signal, for providing a second one of the at least two code signals for a corresponding second one of the at least two types of the code division multiple access receiver processing; and
a code selector, responsive to the mode selection signal, to said first one of the at least two code signals and to said second one of the at least two code signals, for providing said first one of the at least two code signals or said second one of the at least two code signals, selected by the code selector based on the mode selection signal, for further processing by the at least one multimode receiving channel block using said shared circuitry operation.

7. The multimode receiver of claim 6, wherein the first code generator, the second code generator or both code generators contain binary offset carrier capabilities.

8. The multimode receiver of claim 6, wherein the first one of the at least two code signals is for global positioning system receiver processing and the second one of the at least two code signals is for Galileo receiver processing.

9. The multimode receiver of claim 2, wherein the at least one multimode receiving channel block comprises:
a code numerically controlled oscillator block responsive to the code control signal, for providing a numerically controlled oscillator clock signal; and
a universal code generator, responsive to the numerically controlled oscillator clock signal and to the mode-generating selection signal, for generating and providing, based on the mode-generating selection signal, a first one of the at least two code signals for a corresponding first one of the at least two types of the code division multiple access receiver processing or a second one of the at least two code signals for a corresponding second one of the at least two types of the code division multiple access receiver processing for further processing by the at least one multimode receiving channel block using said shared circuitry operation.

10. The multimode receiver of claim 9, wherein the universal code generator contains binary offset carrier capabilities.

11. The multimode spread spectrum receiver of claim 1, wherein said receiver is a multimode global navigation satellite system receiver.

12. The multimode receiver of claim 11, wherein a first one of the at least two code signals is for global positioning system receiver processing and a second one of the at least two code signals is for Galileo receiver processing.

13. A method, comprising:
receiving the radio frequency signal containing said at least two types of code division multiple access signals by an antenna of a multimode spread spectrum receiver and converting said radio frequency signal to a radio frequency electrical signal;
converting the radio frequency electrical signal to a digital signal by a preprocessor of the multimode spread spectrum receiver and providing said digital signal to the at least one multimode receiving channel block; and
selecting by at least one multimode receiving channel block, based on a predetermined selection criteria, one of at least two types of coding corresponding to one of said at least two types code division multiple access signals and utilizing said coding for further processing of said digital signal by said at least one multimode receiving block using a shared circuitry operation.

14. The method of claim 13, wherein the digital signal is a digital intermediate frequency signal, wherein said selection is performed by the at least one multimode receiving channel block in response to a mode selection signal or to a mode-generating selection signal and wherein said at least one multimode receiving channel block is configured to generate, based on said selection, and to provide internally one of the at least two code signals to said at least one multimode receiving channel block for implementing said further processing.

15. The method of claim 14, wherein said selection by at least one multimode receiving block, based on a predetermined selection criteria, of one of at least two types of coding comprises:
generating a first one of the at least two code signals for a corresponding first one of the at least two types of the code division multiple access receiver processing by a first code generator and generating a second one of the at least two code signals for a corresponding second one of the at least two types of the code division multiple access receiver processing by a second code generator and providing said first one of the at least two code signals and said second one of the at least two code signals to a code selector of the at least one multimode receiving channel block, wherein said first one of the at least two code signals and said second one of the at least two code signals are parts of said at least one multimode receiving channel block;
selecting said first one of the at least two code signals or said second one of the at least two code signals by the code selector; and
providing the selected said first one of the at least two code signals or said second one of the at least two code signals for further processing by the at least one multimode receiving channel block using said shared circuitry operation.

16. The method of claim 15, wherein said selecting of said first one of the at least two code signals or said second one of the at least two code signals by the code selector is based on the mode selection signal provided to the code selector by a receiver processing block.

17. The method of claim 15, wherein before said generating the first one of the at least two code signals and the second one of the at least two code signals, the method further comprises:
providing a code control signal to a code numerically controlled oscillator block of the at least one multimode receiving channel block; and
generating, in response to said code control signal, a numerically controlled oscillator clock signal by the code numerically controlled oscillator block and providing the numerically controlled oscillator clock signal to the first code generator and to the second code generator.

18. The method of claim 17, wherein said code control signal is provided to the code numerically controlled oscillator block by a receiver processing block.

19. The method of claim 15, wherein the further processing is performed by an integrating and dumping block of the at least one multimode receiving channel block.

20. The method of claim 19, wherein before said providing the code control signal, the method further comprises:
generating a data intermediate signal by removing a residual carrier frequency from the digital intermediate frequency signal by a residual carrier removing block of the at least one multimode receiving channel block and providing said data intermediate signal to the integrating and dumping block for further processing.

21. The method of claim 14, wherein said selection by at least one multimode receiving block, based on a predetermined selection criteria, of one of at least two types of coding comprises: generating a first one of the at least two code signals for a corresponding first one of the at least two types of the code division multiple access receiver processing or a second one of the at least two code signals for a corresponding second one of the at least two types of the code division multiple access receiver processing by a universal code generator of the at least one multimode receiving channel block; and
providing the first one of the at least two code signals or the second one of the at least two code signals by the universal code generator for further processing by the at least one multimode receiving channel block using said shared circuitry operation.

22. The method of claim 21, wherein said generating the first one of the at least two code signals or the second one of the at least two code signals by the universal code generator is based on the mode-generating selection signal provided to the universal code generator by a receiver processing block.

23. The method of claim 21, wherein before said generating the first one of the at least two code signals and the second one of the at least two code signals, the method further comprises:
providing a code control signal to a code numerically controlled oscillator block of the at least one multimode receiving channel block; and
generating, in response to said code control signal, a numerically controlled oscillator clock signal by the code numerically controlled oscillator block and providing the numerically controlled oscillator clock signal to the universal code generator.

24. The method of claim 21, wherein said code control signal is provided to the code numerically controlled oscillator block by a receiver processing block.

25. The method of claim 21, wherein the further processing is performed by an integrating and dumping block of the at least one multimode receiving channel block.

26. The method of claim 25, wherein before said providing the code control signal, the method further comprises:
generating a data intermediate signal by removing a residual carrier frequency from the digital intermediate frequency signal by a residual carrier removing block of the at least one multimode receiving channel block and providing said data intermediate signal to the integrating and dumping block for further processing.

27. The method of claim 13, wherein said receiver is a multimode global navigation satellite system receiver.

28. The method of claim 27, wherein a first one of the at least two code signals is for global positioning system receiver processing and a second one of the at least two code signals is for Galileo receiver processing.

29. A computer program product comprising: a computer readable storage structure embodying computer program code thereon for execution by a computer processor with said computer program code, wherein said computer program code comprises instructions for performing the method of claim 13, indicated as being performed by the multimode spread spectrum receiver, or by the multimode receiving channel block of said spread spectrum receiver, or by a terminal containing said spread spectrum receiver.

30. A system, comprising:
at least one satellite, for providing at least two types of code division multiple access signals, or at least two satellites each providing one of said at least two types of the code division multiple access signals;
at least one base station, for providing said at least two types of the code division multiple access signals used for mobile communications; and
a terminal, responsive to said at least two different types of the code division multiple access signals, wherein said terminal containing said multimode spread spectrum receiver capable of receiving said at least two types of code division multiple access signals using at least one multimode receiving channel block, responsive to the digital signal indicative of one of said at least two different types of the code division multiple access signals and configured to select, based on a predetermined selection criteria, one of at least two types of coding corresponding to said one of the at least two types code division multiple access signals and utilizing said coding for further processing of said digital signal by said at least one multimode receiving block using a shared circuitry operation.

31. The system of claim 30, wherein a first one of the at least two code signals is for global positioning system receiver processing and a second one of the at least two code signals is for Galileo receiver processing.

32. A multimode receiving module, comprising:
at least one multimode receiving channel block, responsive to a digital signal containing one of at least two types of code division multiple access signals and configured to select, based on a predetermined selection criteria, one of at least two types of coding corresponding to one of said at least two types code division multiple access signals and utilizing said coding for further processing of said digital signal by said at least one multimode receiving block using a shared circuitry operation,
wherein said multimode receiving module is configured to be removed from a multimode spread spectrum receiver.

33. The multimode receiving module of claim 32, wherein a first one of the at least two code signals is for global positioning system receiver processing and a second one of the at least two code signals is for Galileo receiver processing.

34. A multimode spread spectrum receiver, comprising:
means for receiving, responsive to a radio frequency signal containing at least two types of code division multiple access signals, for providing a radio frequency electrical signal;
means for processing, responsive to the radio frequency electrical signal, for providing a digital signal; and
means for multimode channel reception, responsive to the digital signal and configured to select, based on a predetermined selection criteria, one of at least two types of coding corresponding to one of said at least two types code division multiple access signals and utilizing said coding for further processing of said digital signal by said means for multimode channel reception using a shared circuitry operation.

35. The multimode spread spectrum receiver of claim 34, wherein said means for receiving is an antenna.

* * * * *